United States Patent
Luthra et al.

(10) Patent No.: US 10,929,210 B2
(45) Date of Patent: Feb. 23, 2021

(54) COLLABORATION SYSTEM PROTOCOL PROCESSING

(71) Applicant: Box, Inc., Redwood City, CA (US)

(72) Inventors: Tanooj Luthra, San Diego, CA (US); Ritik Malhotra, San Jose, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/029,545

(22) Filed: Jul. 7, 2018

(65) Prior Publication Data

US 2019/0012221 A1    Jan. 10, 2019

Related U.S. Application Data

(60) Provisional application No. 62/530,043, filed on Jul. 7, 2017.

(51) Int. Cl.
  *G06F 9/54* (2006.01)
  *H04L 29/08* (2006.01)

(52) U.S. Cl.
  CPC ............ *G06F 9/547* (2013.01); *H04L 67/146* (2013.01); *H04L 67/02* (2013.01)

(58) Field of Classification Search
  None
  See application file for complete search history.

(56) References Cited

U.S. PATENT DOCUMENTS

| | | | |
|---|---|---|---|
| 6,512,529 B1 | 1/2003 | Janssen | |
| 6,750,858 B1 | 6/2004 | Rosenstein | |
| 7,047,309 B2 | 5/2006 | Baumann | |
| 7,694,065 B2 | 4/2010 | Petev | |
| 7,975,018 B2 | 7/2011 | Unrau | |
| 8,180,801 B2 | 5/2012 | Zhang | |
| 8,489,549 B2 | 7/2013 | Guarraci | |
| 8,527,549 B2 | 9/2013 | Cidon | |

(Continued)

OTHER PUBLICATIONS

Wang, Haiyang, et al., "On the Impact of Virtualization on Dropbox-like Cloud File Storage/Synchronization Services", IWQoS '12, Coimbra, Portugal, Jun. 4-5, 2012, Article No. 11, 9 pages.

(Continued)

*Primary Examiner* — Shih-Wei Kraft
(74) *Attorney, Agent, or Firm* — Vista IP Law Group, LLP

(57) ABSTRACT

A protocol processor for Internet-accessible collaboration systems. A protocol processor is coded into a user interface module that communicates with an Internet-accessible collaboration system. After downloading the user interface module to a user's device, the user interface is launched. The user interface includes an area configured to receive user-specified non-HTTP uniform resource identifiers (URIs). The protocol processor of the user interface module interprets URI-formatted input from the user, and compares the user's URI-formatted input to a set of protocols that are configured into the protocol processor. Any of a set of non-HTTP uniform resource identifiers can correspond to respective API call entry points. A portion of the non-HTTP URI is mapped an API entry point, and any parameters specified in other portions of the non-HTTP URI are mapped to corresponding API parameters. The API is invoked with the parameters to cause actions to be taken at the Internet-accessible collaboration system.

20 Claims, 13 Drawing Sheets

(56) References Cited

U.S. PATENT DOCUMENTS

| | | |
|---|---|---|
| 8,849,761 B2 | 9/2014 | Prahlad |
| 8,886,894 B2 | 11/2014 | Adi-Tabatabai |
| 9,210,085 B2 | 12/2015 | Harrison |
| 9,253,166 B2 | 2/2016 | Gauda |
| 9,384,209 B2 | 7/2016 | Kim |
| 9,444,695 B2 | 9/2016 | Dutta |
| 9,544,348 B2 | 1/2017 | Devereaux |
| 9,628,268 B2 | 4/2017 | Kiang et al. |
| 9,715,428 B1 | 7/2017 | Morshed |
| 9,756,022 B2 | 9/2017 | Amiri et al. |
| 9,852,361 B1 | 12/2017 | Prasad |
| 9,940,241 B1 | 4/2018 | Mehrotra |
| 10,025,796 B2 | 7/2018 | Ravikumar et al. |
| 2003/0046366 A1* | 3/2003 | Pardikar ............... H04L 29/06 709/219 |
| 2004/0019645 A1* | 1/2004 | Goodman ............. G06Q 10/107 709/206 |
| 2004/0107319 A1 | 6/2004 | D'Orto |
| 2006/0041661 A1* | 2/2006 | Erikson ............... G06F 21/6227 709/225 |
| 2007/0076626 A1 | 4/2007 | Wise |
| 2008/0098237 A1 | 4/2008 | Dung |
| 2010/0268840 A1 | 10/2010 | Hiie |
| 2010/0332479 A1 | 12/2010 | Prahlad |
| 2011/0066668 A1 | 3/2011 | Guarraci |
| 2011/0320733 A1 | 12/2011 | Sanford |
| 2013/0110961 A1 | 5/2013 | Jadhav |
| 2013/0138810 A1 | 5/2013 | Binyamin |
| 2013/0238785 A1 | 9/2013 | Hawk |
| 2013/0339470 A1 | 12/2013 | Jeswani |
| 2014/0118379 A1 | 5/2014 | Hakura |
| 2014/0324929 A1 | 10/2014 | Mason, Jr. |
| 2015/0227602 A1 | 8/2015 | Ramu |
| 2015/0372939 A1 | 12/2015 | Redler, IV |
| 2016/0014095 A1 | 1/2016 | Strayer |
| 2016/0021207 A1* | 1/2016 | Dingwall ............. H04L 67/2814 709/203 |
| 2016/0065364 A1 | 3/2016 | Amiri et al. |
| 2016/0103851 A1 | 4/2016 | Dimitrov |
| 2016/0321287 A1 | 11/2016 | Luthra et al. |
| 2016/0321288 A1 | 11/2016 | Malhotra et al. |
| 2016/0321291 A1 | 11/2016 | Malhotra et al. |
| 2016/0321311 A1 | 11/2016 | Tallamraju et al. |
| 2016/0323351 A1 | 11/2016 | Lurhra et al. |
| 2016/0323358 A1 | 11/2016 | Malhotra et al. |
| 2017/0134344 A1 | 5/2017 | Wu |
| 2017/0141921 A1 | 5/2017 | Berger |

OTHER PUBLICATIONS

Mao, Huajian, et al., "Wukong: A cloud-oriented file service for mobile Internet devices", Journal of Parallel and Distributed Computing, vol. 72, Issue 2, Feb. 2012, pp. 171-184.

Chun, Syung-Gon, et al., "CloneCloud: Elastic Execution between Mobile Device and Cloud", EuroSys '11, Salzburg, Austria, Apr. 10-13, 2011, pp. 301-314.

"Apache Thrift" Wikipedia, URL: https://en.wikipedia.org/wiki/Apache_Thrift, Oct. 27, 2015, Accessed on Jan. 26, 2016, 5 pages.

"REST Docs | Bitcasa Developer Center", URL: https://developer.bitcasa.com/docs/rest/, Sep. 2015, Accessed on Jan. 15, 2016, 188 pages.

"Data deduplication", Wikipedia, URL: https://en.wikipedia.org/wiki/Data_deduplication, Mar. 6, 2016, Accessed on Apr. 10, 2016, 7 pages.

Chiu, David, et al., "Elastic Cloud Caches for Accelerating Service-Oriented Computations", SC '10, New Orieans, LA, Nov. 13-19, 2010, 11 pages.

Haining, Theodore R., et al., "Management Policies for Non-Volatile Write Caches", PCCC 1999, Scottsdale, AZ, Feb. 12, 1999, pp. 321-328.

Kim, Hwanju, et al., "XHive: Efficient Cooperative Caching for Virtual Machines", IEEE Transactions on Computers, vol. 60, No. 1, Jan. 2011, pp. 106-119.

Kim, Hyeon Gyu, et al., "Time-slide window join over data streams", Journal of Intelligent Information Streams, vol. 43, Issue 2, Oct. 2014, pp. 323-347.

Li, Jin, et al., "AdaptWID: An Adaptive, Memory-Efficient Window Aggregation Implementation", IEEE Internet Computing, vol. 12, Issue 6, Nov.-Dec. 2008, pp. 22-29.

Li, Jin, et al., "Semantics and Evaluation Techniques for Window Aggregates in Data Streams", ACM SIGMOD 2005, Baltimore, MD, Jun. 14-16, 2005, pp. 311-322.

Mancuso, Renato, et al., "Real-Time Cache Management Framework for Multi-core Architectures", RTAS 2013, Philadelphia, PA, Apr. 9-11, 2013, pp. 45-54.

Patrournpas, Kostas, et al., "Maintaining consistent results of continuous queries under diverse window specifications", Information Systems, vol. 36, Issue 1, Mar. 2011, pp. 42-61.

Patroumpas, Kostas, et al., "Window Specification over Data Streams", EDBT 2006 Workshops, LNCS 4254, © IFIP International Federation for Information Processing© 2006, pp. 445-464.

Peng, Chunyi, et al., "VON: Virtual Machine Image Distribution Network for Cloud Data Centers", INFOCOM 2012, Orlando., FL, Mar. 25-30, 2012, pp. 181-189.

Saxena, Moh It, et al., "Flash Tier: A Lightweight, Consistent and Durable Storage Cache", EuroSys '12, Bern, Switzerland, Apr. 10-13, 2012, pp. 267-280.

Stefanov, Emil, et al., "Iris: A Scalable Cloud File System with Efficient Integrity Checks", ACSAC '12, Orlando, FL, Dec. 3-7, 2012, pp. 229-238.

Zhou, Yuanyuan, et al., "Second-Level Buffer Cache Management", IEEE Transactions on Parallel and Distributed Systems, vol. 15, No. 6, Jun. 2004, pp. 505-519.

\* cited by examiner

COLLABORATION SYSTEM PROTOCOL PROCESSING

RELATED APPLICATIONS

The present application claims the benefit of priority to U.S. Patent Application Ser. No. 62/530,043 titled "COLLABORATION SYSTEM PROTOCOL PROCESSING", filed Jul. 7, 2017, which is hereby incorporated by reference in its entirety.

FIELD

This disclosure relates to collaboration system application deployment, and more particularly to techniques for collaboration system protocol processing.

BACKGROUND

Interfaces to collaboration systems often involve use of application programming interfaces (APIs), which APIs can be selected by an application developer, then coded, using a programming language, into an application or app, which is in turn deployed to users for execution on their respective user devices.

Unfortunately, use of such APIs demands a certain programming language code development skill level that may exceed the code development skill level of many collaborators. For example, an engineer who works in an enterprise might be able to define an application to perform collaboration operations with the collaboration system, however a less technical user in the same organization might not possess such a degree of code development expertise. What is needed is an easier way for human users of varying skill levels to interact with a collaboration system without reliance on code development.

SUMMARY

The present disclosure describes techniques used in systems, methods, and in computer program products for collaboration system protocol processing, which techniques advance the relevant technologies to address technological issues with legacy approaches. More specifically, the present disclosure describes techniques used in systems, methods, and in computer program products for collaboration system protocol processing. Certain embodiments are directed to technological solutions for deploying a protocol engine to user devices that abstract implementation details pertaining to an application (e.g., a web application, a native application, etc.), or app.

The disclosed embodiments modify and improve over legacy approaches. In particular, the herein-disclosed techniques provide technical solutions that address the technical problems attendant to simplifying access to data and actions in collaboration systems. Some of the disclosed technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. More specifically, use of the disclosed techniques eliminate or reduce the need for command-specific application development or app development or application programming interface development, thereby eliminating or reducing the need for computing resources needed to compile, link and deploy the aforementioned applications and/or apps and/or application programming interfaces as would be necessary in other approaches.

Moreover, some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in technical fields pertaining to collaboration systems as well as advances in various technical fields related to human-machine interfaces.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
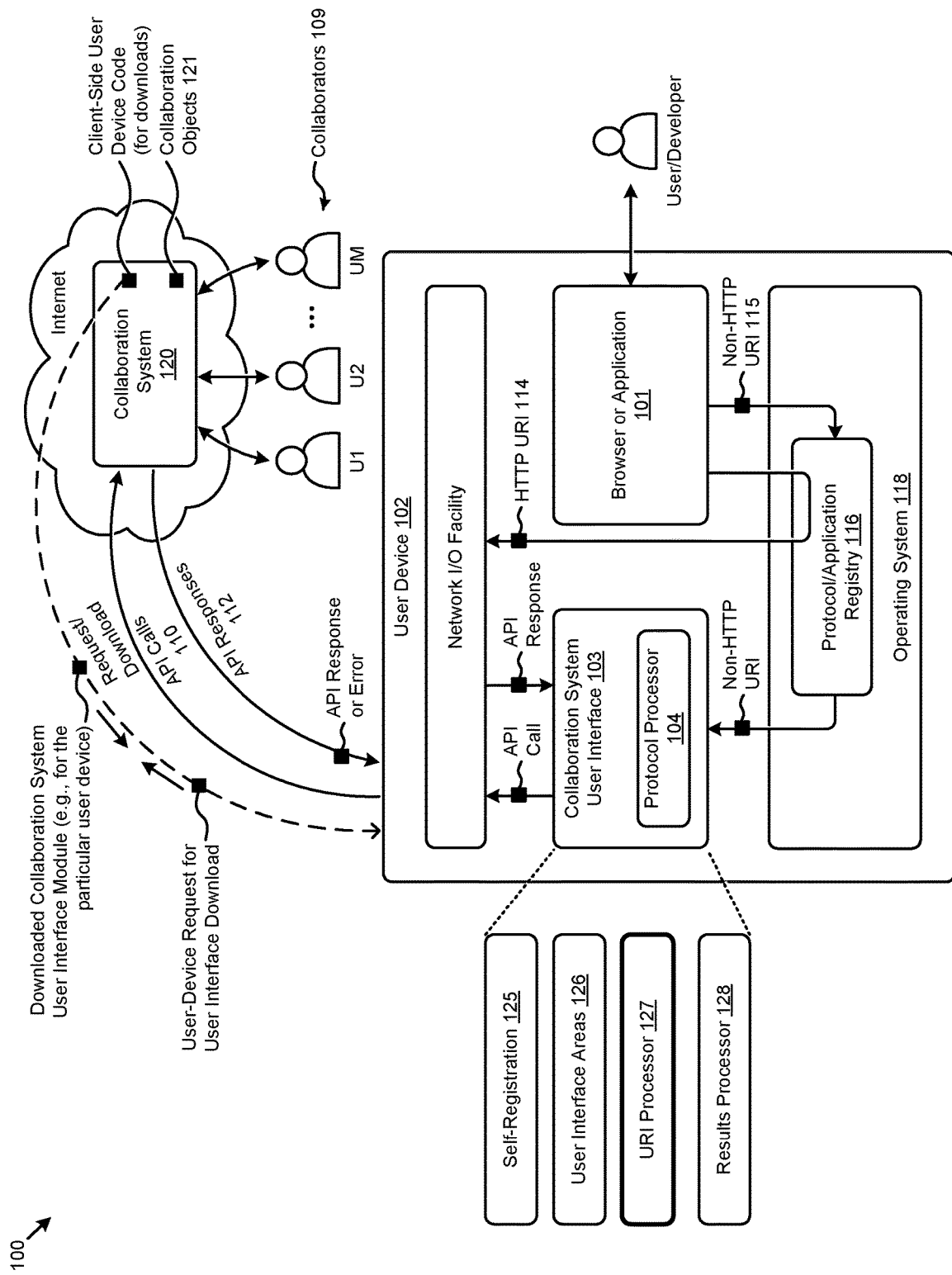
FIG. 1 presents an environment that includes a downloadable collaboration system user interface module that is used for collaboration system protocol processing, according to an embodiment.

Embodiments in accordance with the present disclosure address the problem of simplifying access to data and actions in collaboration systems. Some embodiments are directed to approaches for deploying a protocol engine to user devices that abstract implementation details from an application, app or user. The accompanying figures and discussions herein present example environments, systems, methods, and computer program products for collaboration system protocol processing.

Overview

Disclosed herein is a protocol processor that interprets developer- or user-defined text strings to identify an action or actions for the collaboration system to perform. The protocol processor interprets developer- or user-defined text strings in lieu of invoking the identified action or actions via an application programming interface. Some embodiments of the aforementioned text strings include parameters that pertain to the action or actions specified in the text strings.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

When a user interacts with a collaboration system from a user interface that might be hosted on a laptop or smart phone, the user might want to interact in certain ways that are not supported by the user interface. One way to address this desire is to provide a text-oriented interface that flexibly supports user interactions with the collaboration system. Such a text-oriented interface can be provided via a download to the user's device. The text-oriented interface can be combined with a protocol processor that interprets user inputs and makes corresponding API calls. The user does not need to write any code to invoke the API call—instead, the protocol processor converts user-input text into parameter values and makes the API call on behalf of the user. This technique can be used in any environment. One such environment that support the foregoing is shown and described as follows.

FIG. 1 presents an environment 100 that includes a downloadable collaboration system user interface module that is used for collaboration system protocol processing. As an option, one or more variations of environment 100 or any aspect thereof may be implemented in the context of the architecture and functionality of the embodiments described herein.

The user device of FIG. 1 includes a protocol processor that interprets developer- or user-defined text strings to identify an action or actions for the collaboration system to perform. The protocol processor interprets developer- or user-defined text strings as a replacement for invoking the identified action or actions via user-developed code that invokes the API call.

The embodiment shown in FIG. 1 is merely one example. As shown, the environment includes a collaboration system 120 that serves a set of collaborators 109 (e.g., user U1, user U2, . . . , user UM). In addition to stored collaboration objects 121, the collaboration system holds code that is downloaded to any one or more user devices. A user device 102 hosts an operating system 118 (e.g., iOS or a Microsoft OS) that can interact with the collaboration system using a network input/output (I/O or IO) protocol, possibly involving communication via a LAN or WAN.

In this specific embodiment, the client-side code is downloaded to the user device in the form of a collaboration system user interface 103. The collaboration system user interface uses services of the operating system as well as services of a network I/O facility. In some cases, and as shown, collaboration system user interface operates independently and cooperatively with a browser or other application 101. More specifically, the browser can avail itself of the services of the operating system and the network I/O facility to carry out browser communications over the "HTTP" protocol. Additionally, the browser can recognize a non-HTTP uniform resource identifier (URI), and can pass that non-HTTP uniform resource identifier (e.g., a URI text string) to the operating system. The operating system can in turn access its protocol/application registry 116 and deliver the non-HTTP uniform resource identifier to a registered application. In the case shown, the collaboration system user interface is the registered application. The collaboration system user interface receives the non-HTTP uniform resource identifier and processes it using the protocol processor 104. The protocol processor transforms the non-HTTP URI 115 into one or more API calls 110 to respective API entry points, which calls in turn trigger actions to be taken by the shown Internet-accessible collaboration system. The protocol processor can use the network I/O facility to send API calls as well as to receive API responses 112 back from respective API calls.

The partitioning shown in FIG. 1 is merely one example and other partitions are possible. Specifically, the partitioning shown involving self-registration 125, user interface areas 126, a URI processor 127, and a results processor 128 is merely an illustrative example. In some cases, the collaboration system 120 might be a single user system that serves only one user, nevertheless the protocol processor can interpret non-HTTP uniform resource identifiers and corresponding parameters so as to be able to initiate API calls that result in actions being taken in or by the single user system. In still other cases, the collaboration system 120 might be a collaboration system in which no files or objects have been populated or shared, nevertheless the protocol processor can interpret non-HTTP uniform resource identifiers and corresponding parameters so as to be able to initiate API calls that result in actions being taken in or by the collaboration system. In any or all of the foregoing cases, aspects of the environment 100 can be set up programmatically and made ready for ongoing protocol processing. Strictly as one example, a set of set-up operations and a set of steps for protocol processing are shown and described as pertains to the implementation techniques of FIG. 2.

Figure 2:
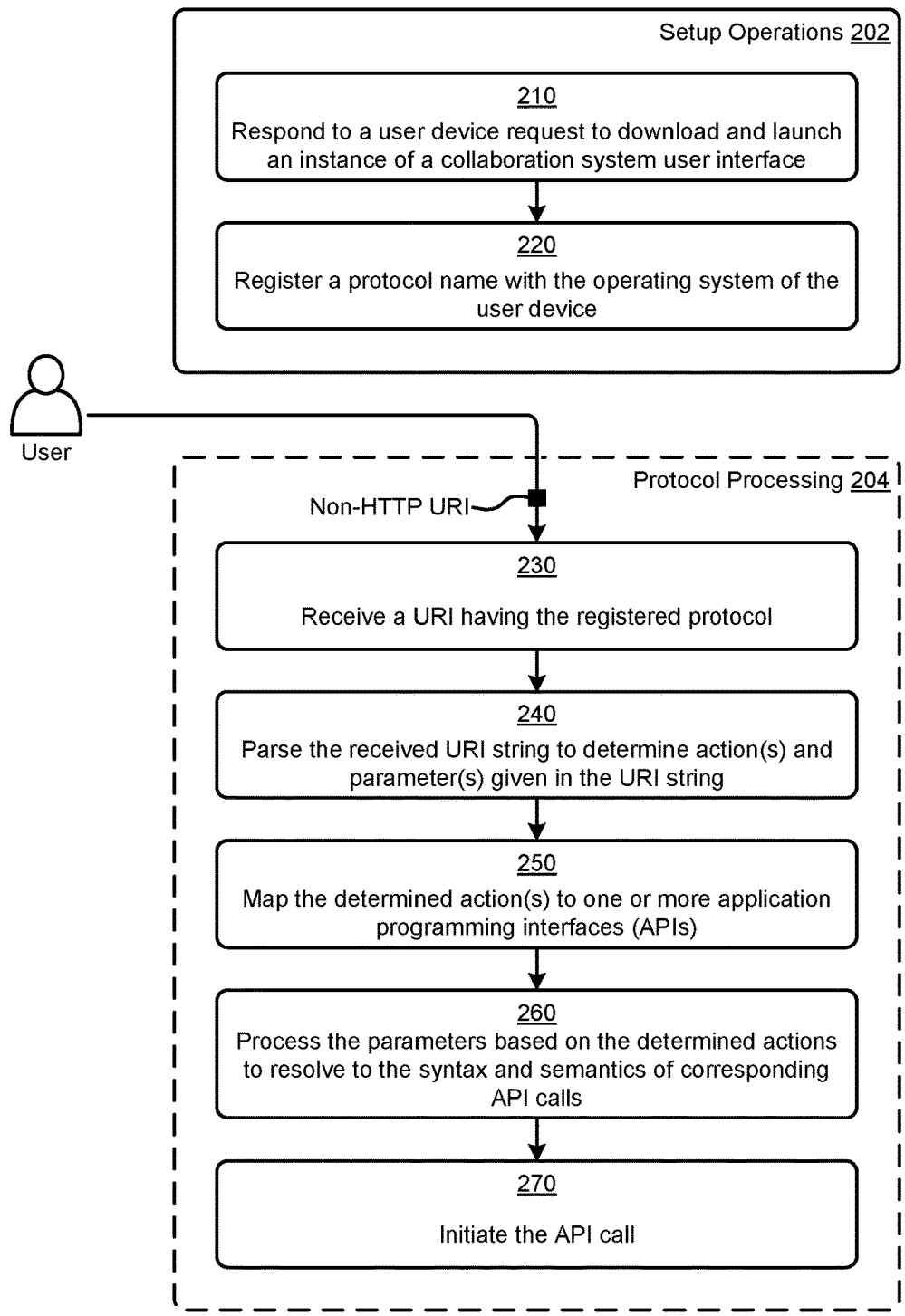
FIG. 2 is a flowchart of an implementation technique as used for deploying and running a collaboration system user interface, according to an embodiment.

FIG. 2 is a flowchart of an implementation technique 200 as used for deploying and running a collaboration system user interface. As an option, one or more variations of implementation technique 200 or any aspect thereof may be implemented in the context of the architecture and functionality of the embodiments described herein. The implementation technique 200 or any aspect thereof may be implemented in any environment.

The embodiment shown in FIG. 2 includes a set of steps for set-up operations 202 and a set of steps for protocol processing 204. The set-up operations can be implemented at or by various components of the environment 100. Specifically, step 210 might be implemented by the collaboration system 120 in response to a request from the user device. Such a request might be precipitated by a user's desire to interface his or her device with the collaboration system via a specific implementation of a collaboration system user interface 103. Upon a successful download of an instance of a collaboration system user interface to the requesting user device, the instance of a collaboration system user interface might self-launch to perform further set-up operations on the user's device.

A browser installed on the user device might be configured to process "HTTP" and "HTTPS" protocols, and that browser might have registered itself with the operating system. The downloaded instance of a collaboration system user interface module is configured to be able to register itself with the operating system for performing any non-HTTP or non-HTTPS protocols. In the examples below, the non-HTTP protocol is called "P". In step 220, the downloaded instance of the collaboration system user interface module registers itself with the operating system for performing protocol "P".

Having been set up as heretofore described, the protocol processor 104 can receive non-HTTP URIs that specify protocol "P" or any other protocol as was registered in step 220. As shown, the protocol operates as follows: At step 230, the protocol processor receives a non-HTTP URI. The non-HTTP URI might be a string of characters, or an object that can be converted to a string or characters. At step 240, the non-HTTP URI is parsed so as to extract a string portion that corresponds to an action or actions and any string portions that correspond to the parameters. The action string portion and parameter string portion are used (at step 250) to match to an action verb of the protocol. Having the action verb of the protocol, a dictionary or schema can be consulted to determine which parameters are to be provided together with the action verb. In turn, the action verb of the protocol and its corresponding parameters can be used to construct (at step 260) one or more API calls that are then executed (at step 270) to pass the parameter(s) to the corresponding action endpoint(s) of the collaboration system so as to initiate carrying out the action of the protocol. In some cases, some or all of any results that are responsive to carrying out the action of the protocol are saved and/or returned.

As can be seen from the foregoing, the processing of the non-HTTP URI serves as a substitute for, or replacement for making an API call from a code base. As such, using the aforementioned non-HTTP URIs, a user can interact with the collaboration system without the need to develop code to call the APIs with specific parameter values.

The aforementioned user devices host an operating system, which operating system might be of one variety or another. As such, the processes of step 210 can detect the host operating system and operate in accordance with the interfacing requirements of the detected operating system. Detection of a host operating system and steps to setup a corresponding environment (e.g., to download and configure a protocol interpreter for a particular operating system) is shown and described as pertains to FIG. 3.

Figure 3:
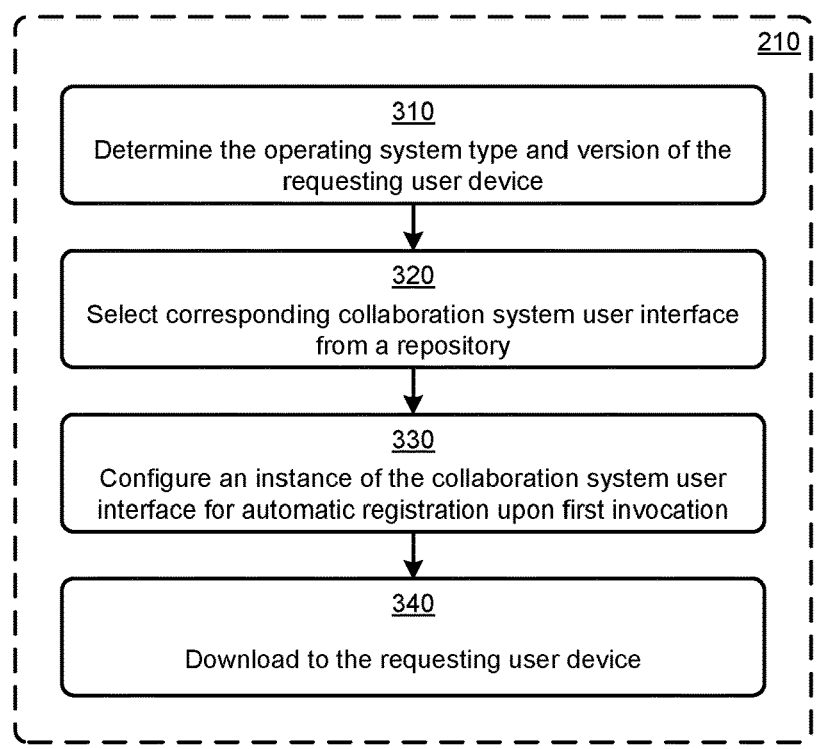
FIG. 3 is a flowchart of an environment setup technique to establish a protocol interpreter used for collaboration system interaction, according to an embodiment.

FIG. 3 is a flowchart of an environment setup technique 300 to establish a protocol interpreter used for collaboration system interaction. As an option, one or more variations of environment setup technique 300 or any aspect thereof may be implemented in the context of the architecture and functionality of the embodiments described herein. The environment setup technique 300 or any aspect thereof may be implemented in any environment.

The embodiment shown in FIG. 3 is merely one example. As shown, after determining the host operating system (at step 310), then at step 320, a protocol interpreter (e.g., within an instance of collaboration system user interface) is selected. The protocol interpreter is then configured for automatic launch and, upon successful configuration (at step 330), the collaboration system user interface with an embedded protocol interpreter is then downloaded the user device (at step 340).

Additional steps are taken once the downloaded instance of collaboration system user interface 103 is invoked. Some such steps (e.g., registration steps) are shown and described as pertains to FIG. 4.

Figure 4:
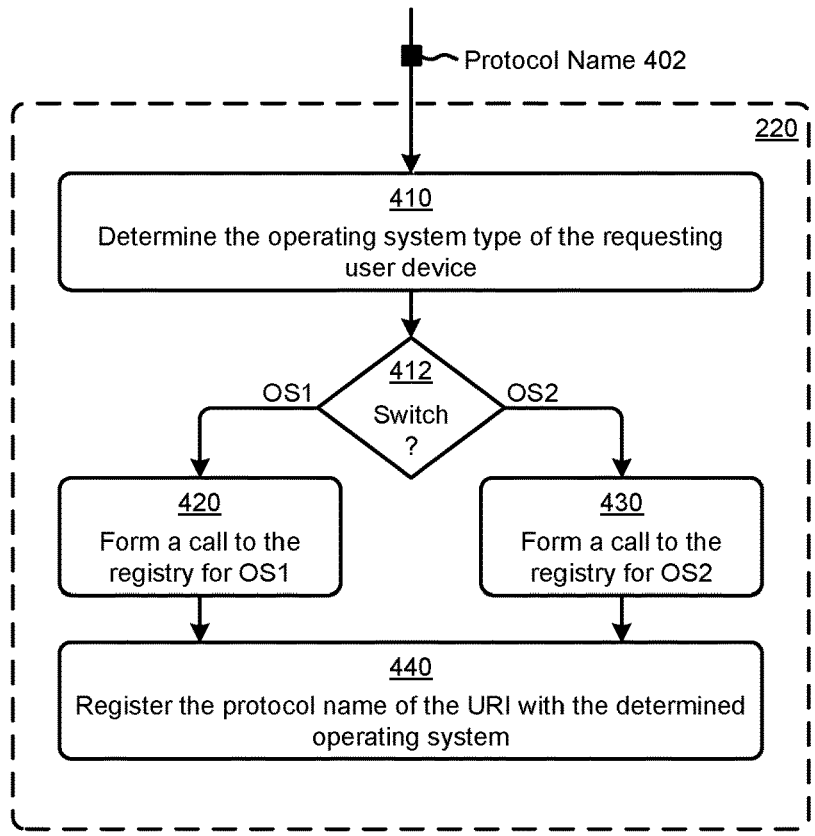
FIG. 4 is a flowchart of a protocol interpreter registration technique that is used to establish an interface between a host operating system and a protocol interpreter, according to an embodiment.

FIG. 4 is a flowchart of a protocol interpreter registration technique 400 that is used to establish an interface between a host operating system and a protocol interpreter. As an option, one or more variations of protocol interpreter registration technique 400 or any aspect thereof may be implemented in the context of the architecture and functionality of the embodiments described herein. The protocol interpreter registration technique 400 or any aspect thereof may be implemented in any environment.

The host operating system had been determined to select a compatible downloadable instance of collaboration system user interface 103. In step 410, the operating system type is determined to execute code corresponding to one of a plurality of paths. Then, as shown, after the determination of the OS in step 410, one of paths—path "OS1" or path "OS2"—is taken by decision 412. In the shown embodiment, either step 420 or step 430 is taken so as to form a call the registry service of the determined operating system. In either case, step 440 serves to register a protocol name 402 (e.g., "P", or "P:") with the operating system. The registration includes naming a service or application. Thenceforth, the operating system delivers received non-HTTP URI strings to the registered service or application. Any of a variety of actions pertaining to the protocol are processed by the registered service or application.

Figure 5A:
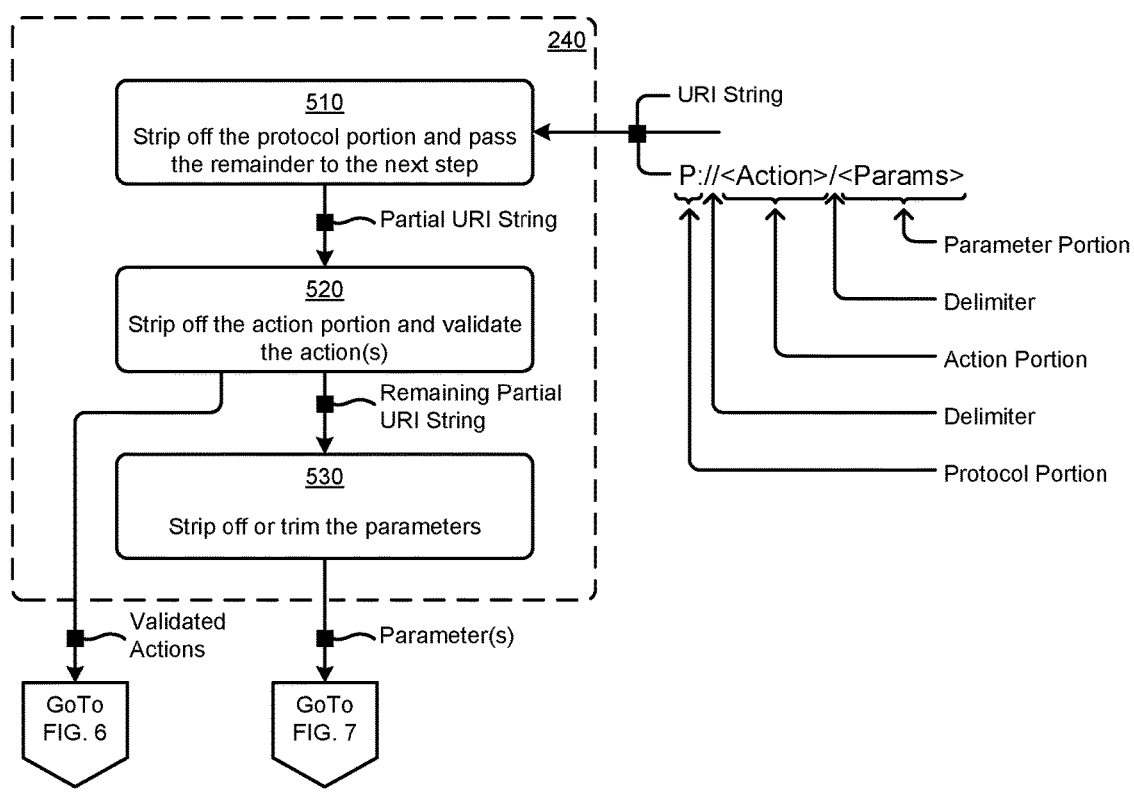
FIG. 5A is a flowchart depicting a protocol-specific action identification technique as used to identify an action to be carried out by a collaboration system, according to an embodiment.
Figure 5B:
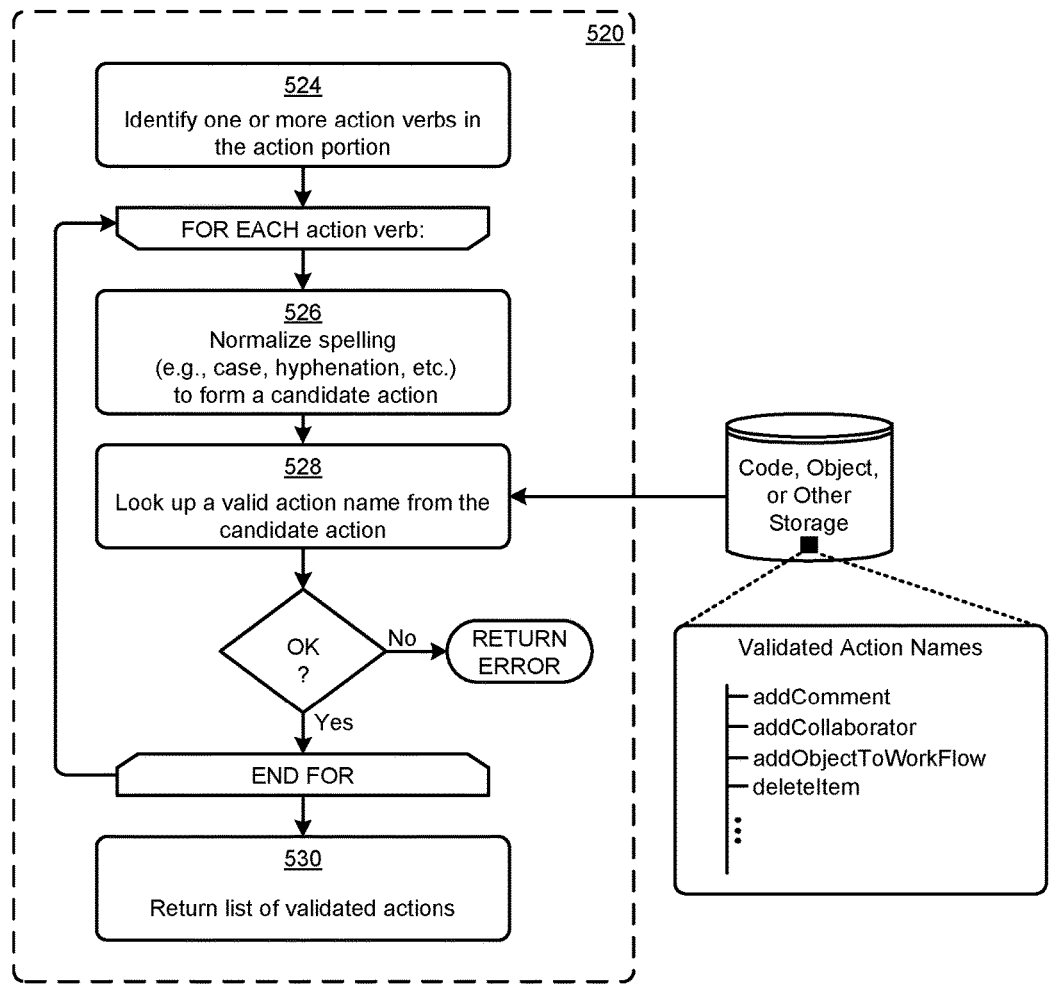
FIG. 5B is a flowchart depicting a protocol-specific action validation technique as used to validate an action to be carried out by a collaboration system, according to an embodiment.

In many situations, the actions pertaining to the protocol to be processed by the registered service or application are abstracted into an action name (e.g., a string or string portion of a URI), which action name is identified and mapped to an API using the techniques of FIG. 5A and FIG. 5B.

FIG. 5A is a flowchart depicting a protocol-specific action identification technique 5A00 as used to identify an action to be carried out by a collaboration system. As an option, one or more variations of protocol-specific action identification technique 5A00 or any aspect thereof may be implemented in the context of the architecture and functionality of the embodiments described herein. The protocol-specific action identification technique 5A00 or any aspect thereof may be implemented in any environment.

The embodiment of FIG. 5A includes a set of operations that perform portions of the parsing of step 240. As shown, the parsing includes text processing to strip off the protocol portion of the non-HTTP URI text string and pass the remainder of the non-HTTP URI text string 510 to subsequent processing steps in the form of a partial URI string. At step 520, delimiters found in the partial URI string are used to locate an action or actions embedded in the non-HTTP URI string. The action is thus isolated and stripped off, leaving only parameters (if any) in the remaining partial URI string, thus, after performing the operations of step 530, the parameters are isolated from within the remaining partial URI string. The isolated action or actions are validated (as exemplified in FIG. 5B) and then passed to a first set of downstream operations (as exemplified in FIG. 6), and the parameter or parameters are passed to a second set of downstream operations (as exemplified in FIG. 7).

FIG. 5B is a flowchart depicting a protocol-specific action validation technique 5B00 as used to validate an action to be carried out by a collaboration system. As an option, one or more variations of protocol-specific action validation technique 5B00 or any aspect thereof may be implemented in the context of the architecture and functionality of the embodiments described herein. The protocol-specific action validation technique 5B00 or any aspect thereof may be implemented in any environment.

In some cases, the action portion of the URI text string that had been identified by the presence of delimiters that contains multiple actions and/or multiple terms that describe a single or compound action. Further, in some cases, the spelling (e.g., uppercase/lowercase variations, hyphenated variations, etc.) might be close enough to be decipherable into a known action or set of actions. Step 524 of the shown subroutine for step 520 serves to identify one or more action verbs in the action portion of the non-HTTP URI. For each such action, the spelling is normalized (at step 526) into a candidate action. The candidate action is looked-up in a schema or dictionary (at step 528), and if the candidate action matches a valid action of the protocol, the validated action name is added (at step 530) to a list of validated actions. Otherwise, an error is returned. A list of validated actions can be in the form of validated action strings (e.g., names of actions), which validated action strings are used for mapping to one or more APIs that then serve to carry out the validated action(s). A validated action name might be indicative of an action to be taken at the collaboration system. Strictly as examples, a validated action can have a name such as "addComment", "addCollaborator", "addObjectToWorkflow", "deleteItem", etc.

Figure 6:
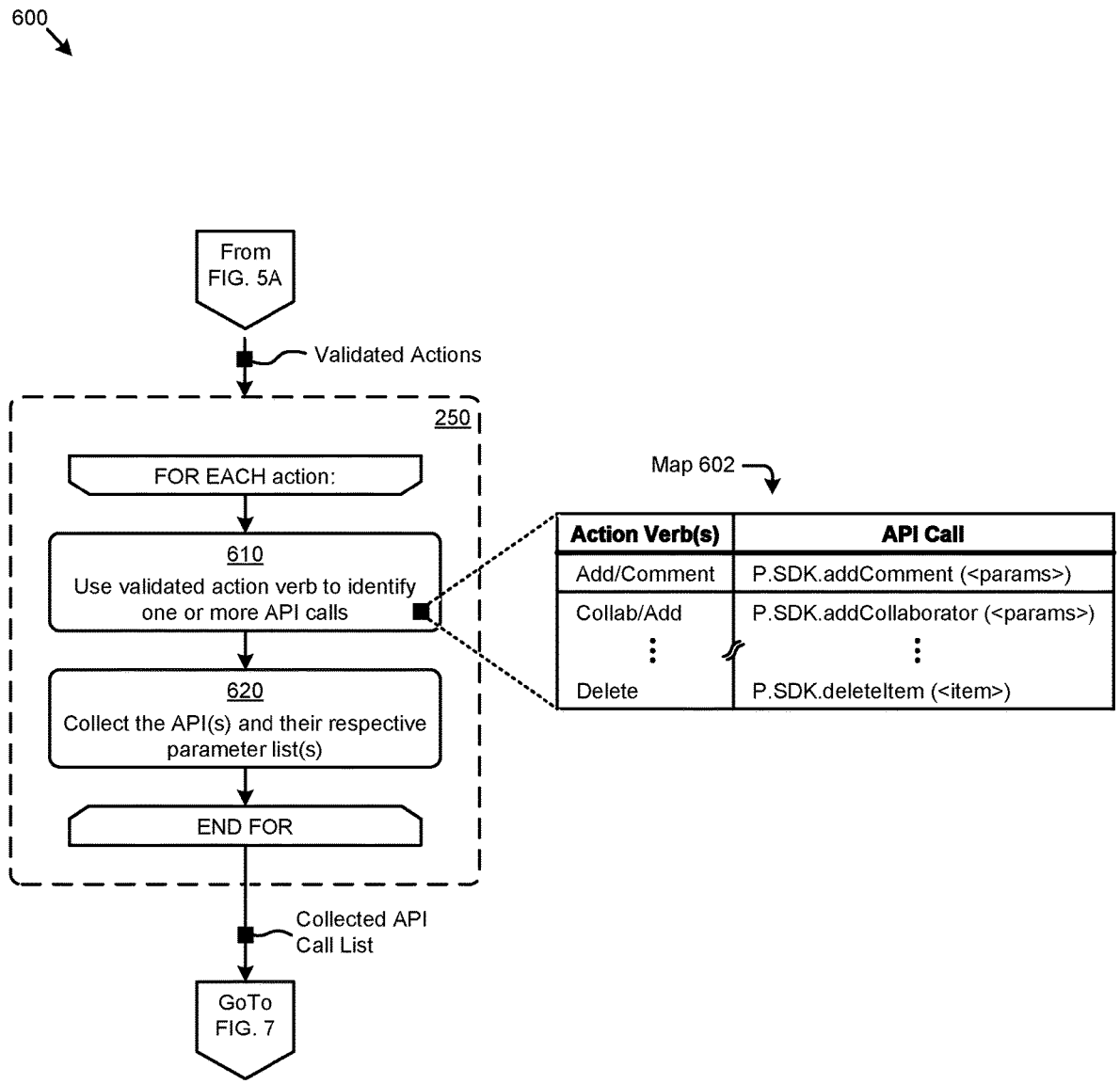
FIG. 6 is a flowchart depicting a protocol-specific API mapping technique as used to invoke an API-specific action to be carried out by a collaboration system, according to an embodiment.

FIG. 6 is a flowchart depicting a protocol-specific API mapping technique 600 as used to invoke an API-specific action to be carried out by a collaboration system. As an option, one or more variations of protocol-specific API mapping technique 600 or any aspect thereof may be implemented in the context of the architecture and functionality of the embodiments described herein. The protocol-specific API mapping technique 600 or any aspect thereof may be implemented in any environment.

As shown, the validated actions produced by step 240 are made available as a validated action list to step 250. Then, for each action given in the validated action list, the action (e.g., the shown action verb) is mapped to one or more API calls. In some cases, an individual one of the validated actions comprise multiple terms that combine to form a compound action verb. In other cases, the validated action in the list is a single term that is itself a single action verb. Step 610 serves to look-up permutations of the actions of the validated action list so as to match an action verb (i.e., a compound action verb or a single action verb) to an API call. As shown, map 602 depicts a data structure that facilitates such a look-up. The entries shown in the map are merely illustrative and other entries involving other action verbs and other APIs are possible and within the scope of the disclosed techniques.

Step 620 serves to collect the mapped-to API calls into a list, which collected API list is made available to subsequent processing. In this particular embodiment, the collected API list is passed to further processing for API call construction. One possible technique for API call construction is now briefly discussed.

Figure 7:
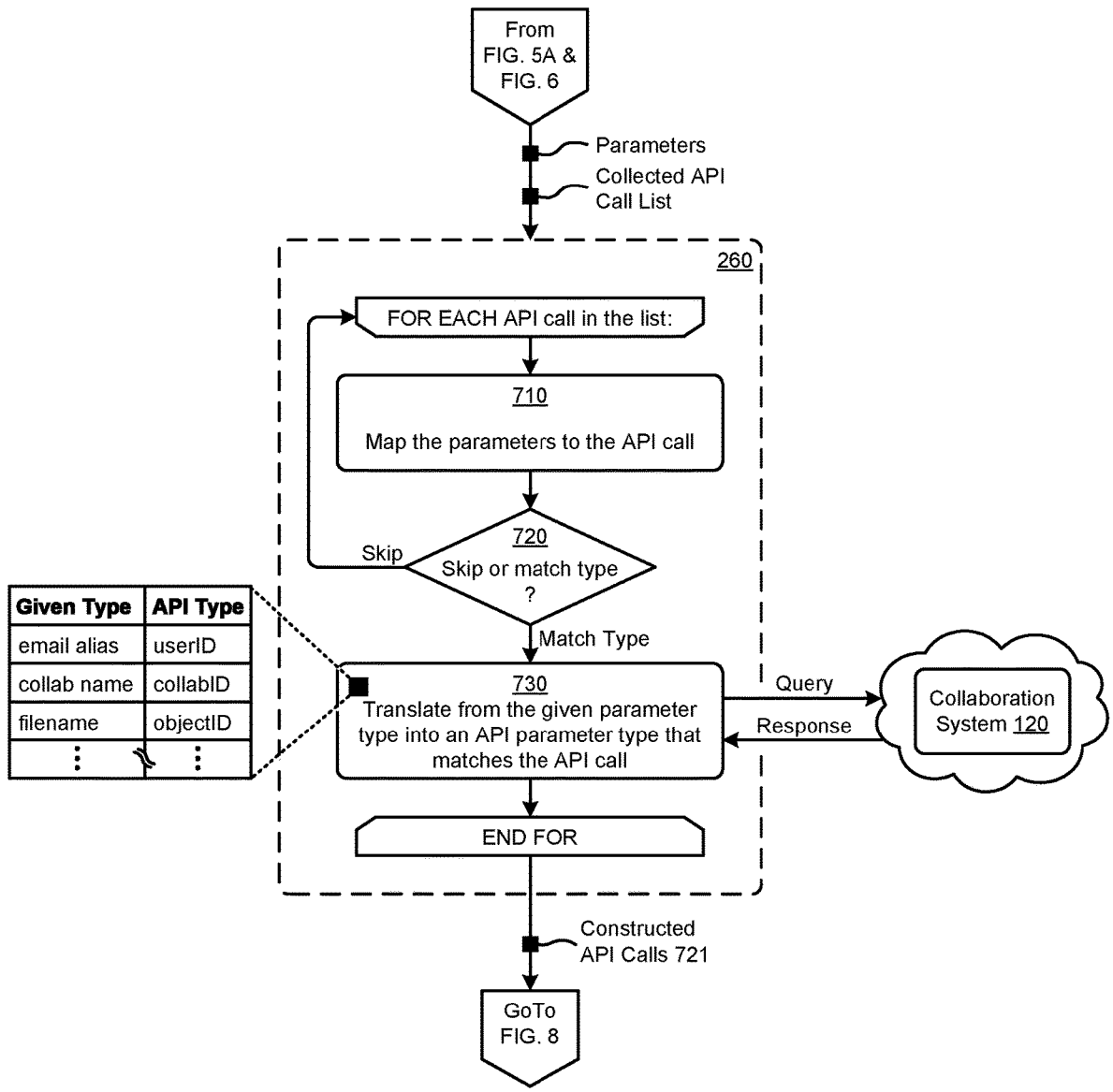
FIG. 7 is a flowchart depicting a API call construction technique as used to invoke a parameterized API pertaining to an action to be carried out by a collaboration system, according to an embodiment.

FIG. 7 is a flowchart depicting an API call construction technique 700 as used to invoke a parameterized API pertaining to an action to be carried out by a collaboration system. As an option, one or more variations of API call construction technique 700 or any aspect thereof may be implemented in the context of the architecture and functionality of the embodiments described herein. The API call construction technique 700 or any aspect thereof may be implemented in any environment.

The API call construction technique 700 is but one possible implementation of step 260. Specifically, API call construction technique 700 is but one possible implementation of a sequence of steps to resolve the actions and parameters taken from the non-HTTP URI string into the syntax and semantics of the mapped-to API calls.

As shown, step 260 of FIG. 7 receives a collected API call list as well as a set of parameters. Then, for each API call in the list, the received parameters are mapped to a corresponding API call 710. As shown in decision 720, if a particular API does not require any parameters, then that API call can be deemed as complete, the "Skip" path can be taken, and the next parameter would be processed in the next iteration. If a given parameter does not match the syntax or semantics of the subject API call, then such a parameter might need to be translated into the type specified by the API call. In some cases, the parameter can be translated locally. In other cases, it might be expeditious to consult the collaboration system 120 so as to take advantage of translation capabilities therefrom.

Strictly as examples, a given parameter might have been provided as an email alias, whereas the parameter expected by the API is a userID. Translations services (e.g., to translate from the given parameter in its given form and semantics to the parameter in the form and semantics that is expected by the subject API) can be provided locally (e.g., as a built-in translation service), or via a service (e.g., web service) accessible at the collaboration system, or both. Within the shown FOR EACH loop, step 730 can be performed any number of times over any number of given parameters. Upon termination of the FOR EACH loop, call construction technique 700 has converted a collection of API call verbs and a set of parameters into one or more complete and properly formatted API calls that are in a condition for execution.

The shown constructed API calls 721 are passed on for processing. The further processing can implement any use model in any environment. For example, constructed API calls pertaining to a subscription service can be processing in an environment such as is shown and discussed as pertains to FIG. 8.

Figure 8:
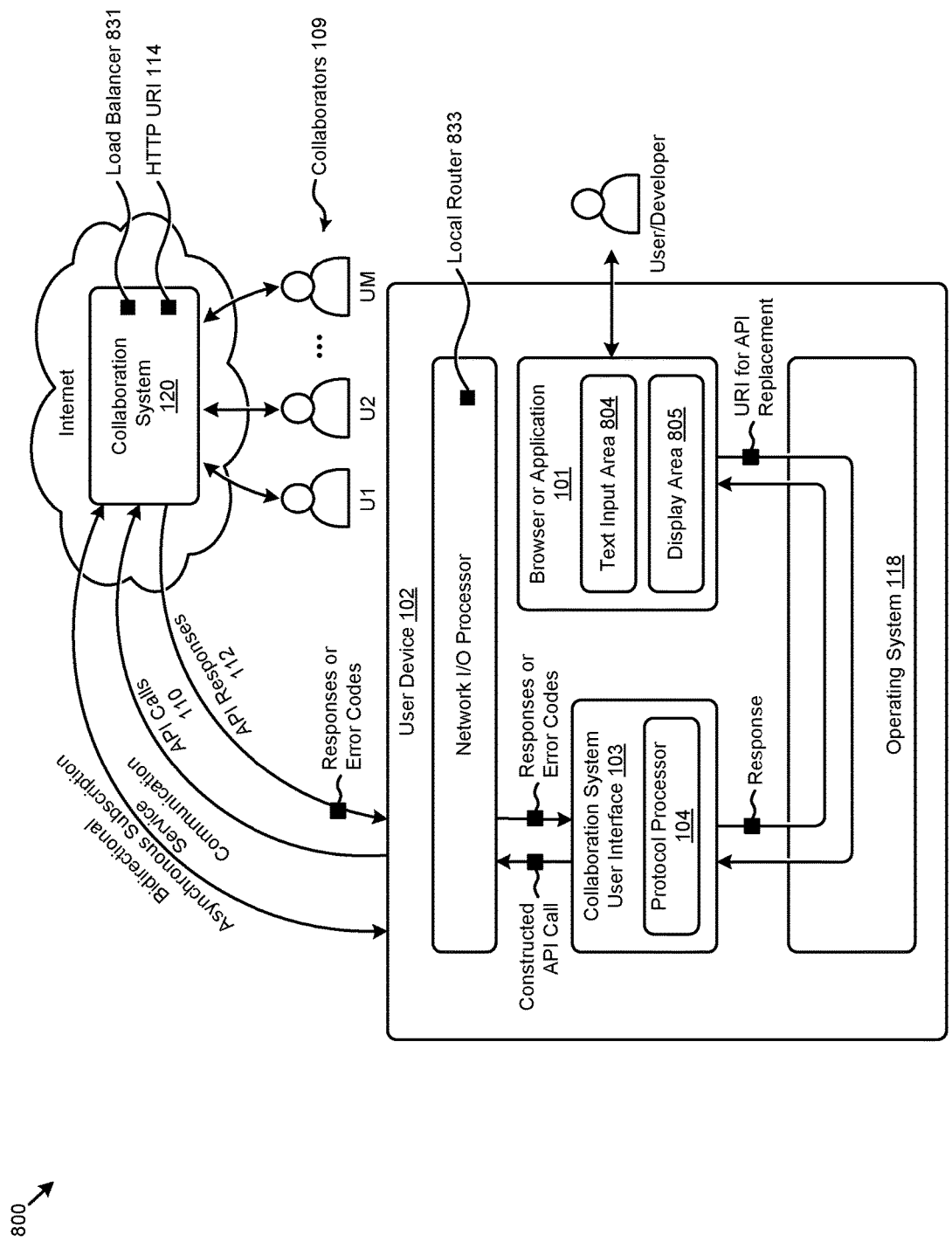
FIG. 8 presents an environment for using a protocol processor to handle asynchronous communications with a collaboration system, according to an embodiment.

FIG. 8 presents an environment 800 for using a protocol processor to handle asynchronous communications with a collaboration system. As an option, one or more variations of environment 800 or any aspect thereof may be implemented in the context of the architecture and functionality of the embodiments described herein.

In some use models, a user/developer interacts with a browser or application using a text input area 804 or other display screen device that serves to capture a URI that is then used as a replacement for an API call. As earlier discussed, the user/developer need not possess a development skill level that might be needed for writing scripting language or other code development. Rather, the protocol portion of the URI can serve as a handle for an API entry point. Thus, interpreted portions of the non-HTTP URI, including the non-HTTP protocol indication, any action verbs, and any corresponding parameters are then used by protocol processor 104 as a replacement for user-implemented code to make an API call. In some embodiments, the API entry point that corresponds to one or more portions of the URI can be an API entry point that exists within the code base of the browser or any browser extensions. In other scenarios, the API entry point that corresponds to one or more portions of the URI can be an API entry point that exists within the code base of the collaboration system user interface 103. Moreover, the client-side code that is downloaded from the collaboration system might include a code base in addition to the aforementioned collaboration system user interface 103. Strictly as one example, the client-side code might comprise any variations of constituents of a client-side application, possibly including compiled code (e.g., such as from 'C' language code), native OS code (e.g., code that makes calls to the native operating system of the user device), interpreted code or scripts (e.g., JavaScript), and any data items as might be a constituent of a client-side application.

In some embodiments, the API entry point that corresponds to the protocol portion of the URI can process through yet another URI (e.g., an HTTP URI 114) that refers to an endpoint within collaboration system 120. In some cases, the address of the endpoint within the collaboration system is determined in whole or in part by a local router 833. Strictly as one example, a URI that refers to an endpoint within the collaboration system might include a domain name string, which is resolved to dotted quads. The domain name string can be resolved in whole or in part by a local router and/or a local or remote domain name server.

In any or all of the foregoing embodiments, the protocol processor issues a constructed API call. Multiple API calls can be issued in sequence without waiting for respective responses from the collaboration system. As such, the combination of the protocol processor and collaboration system serves to implement asynchronous communications. Strictly as one example, a user/developer might use a browser to subscribe to a subscription service provided by the collaboration system. The subscription might be to a "feed" of events pertaining to collaborators 109. A browser or web application can offer the opportunity to sign-up for the subscription using a non-HTTP URI such as "P://subscribe/eventFeed/now", which carries the meaning of requesting a subscription to the feed "eventFeed", which subscription period commences beginning "now". Results of processing the subscription sign-up might include a success acknowledgement or error codes, which in turn might be presented to the user/developer in display area 805.

In some cases, the final action or actions pertaining to the request of the non-HTTP URI might be performed by a dynamically-designated computing element of the collaboration system. Specifically, the final action or actions pertaining to the request of the non-HTTP URI might be performed by a computing element of the collaboration system that is determined on the basis of a load balancer 831 decision.

Additional Embodiments of the Disclosure

Additional Practical Application Examples

Figure 9A:
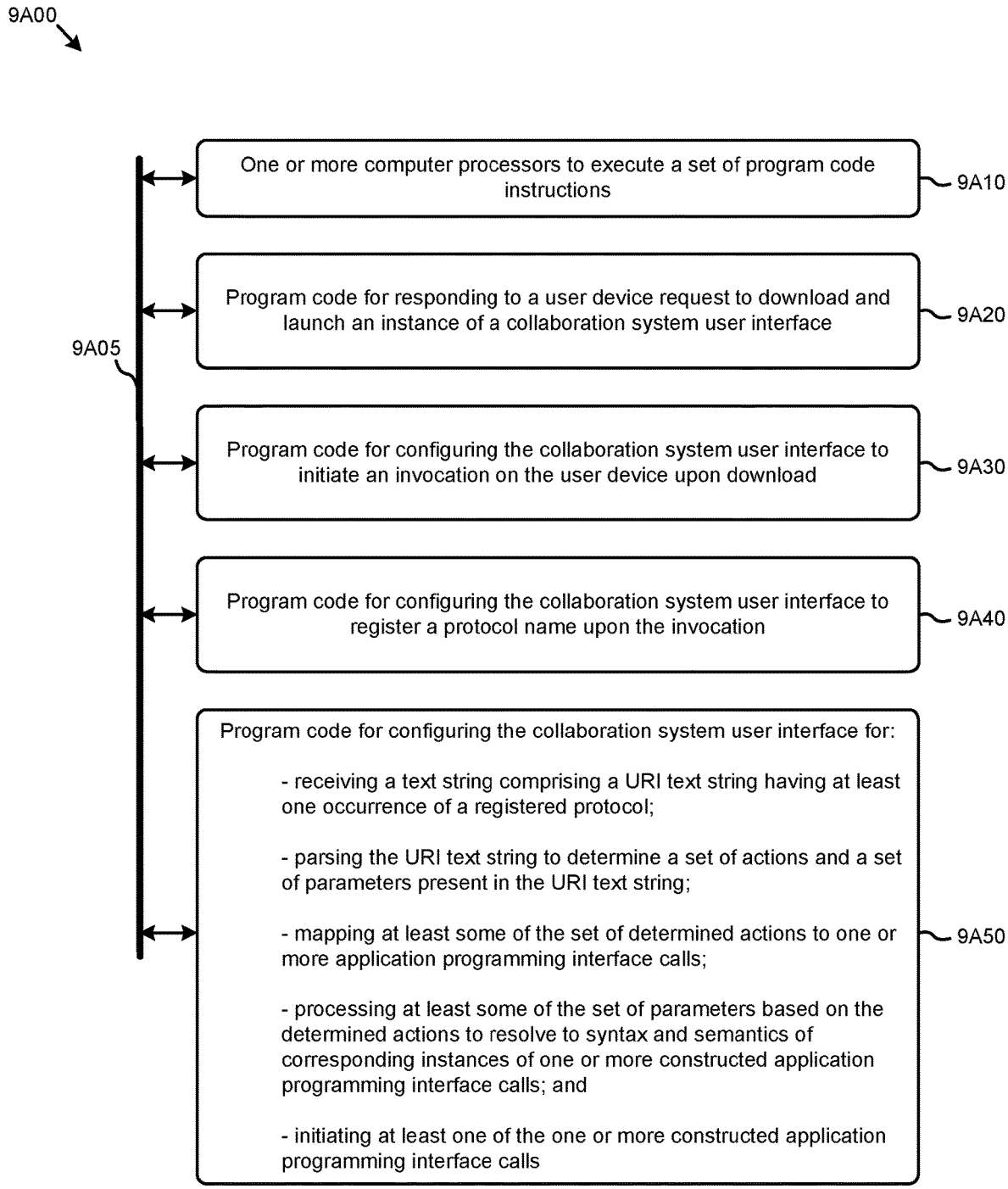
FIG. 9A depicts a system as an arrangement of computing modules that are interconnected so as to operate cooperatively to implement certain of the herein-disclosed embodiments.

FIG. 9A depicts a system 9A00 as an arrangement of computing modules that are interconnected so as to operate cooperatively to implement certain of the herein-disclosed embodiments. The partitioning of system 9A00 is merely illustrative and other partitions are possible. As an option, the system 9A00 may be implemented in the context of the architecture and functionality of the embodiments described herein. Of course, however, the system 9A00 or any operation therein may be carried out in any desired environment.

The system 9A00 comprises at least one processor and at least one memory, the memory serving to store program instructions corresponding to the operations of the system. As shown, an operation can be implemented in whole or in part using program instructions accessible by a module. The modules are connected to a communication path 9A05, and any operation can communicate with other operations over communication path 9A05. The modules of the system can, individually or in combination, perform method operations within system 9A00. Any operations performed within system 9A00 may be performed in any order unless as may be specified in the claims.

The shown embodiment implements a portion of a computer system, presented as system 9A00, comprising one or more computer processors to execute a set of program code instructions (module 9A10) and modules for accessing memory to hold program code instructions to perform: responding to a user device request to download and launch an instance of a collaboration system user interface (module 9A20); configuring the collaboration system user interface to initiate an invocation on the user device upon download (module 9A30); configuring the collaboration system user interface to register a protocol name upon the invocation (module 9A40); configuring the collaboration system user interface to perform the steps of, receiving a text string comprising a URI text string having at least one occurrence of a registered protocol, parsing the URI text string to determine a set of actions and a set of parameters present in the URI text string, mapping at least some of the set of determined actions to one or more application programming interface calls, processing at least some of the set of parameters based on the determined actions to resolve to syntax and semantics of corresponding instances of one or more constructed application programming interface calls, and initiating at least one of the one or more constructed application programming interface calls (module 9A50).

Variations of the foregoing may include more or fewer of the shown modules. Certain variations may perform more or fewer (or different) steps and/or certain variations may use data elements in more or in fewer (or different) operations. Strictly as examples, some embodiments include a collaboration system user interface that display files and folders. Some embodiments perform operations wherein the collaboration system user interface is interfaced to or included with a browser (e.g., a web browser with or without a web browser plug-in module) or web application, or a native application (e.g., an app that executes on the user device without reliance on a browser). Some embodiments operate over a URI text string that comprises a protocol portion, a first delimiter, an action string portion, a second delimiter, and one or more parameter string portions. In some deployments, the mapping comprises one or more of, a look-up into a data structure, or a query to the collaboration system.

In some situations, a downloaded or otherwise deployed collaboration system user interface is configured to perform the steps of: receiving a text string comprising a URI text string having a non-HTTP protocol indication; processing the URI text string to identify at least one action to be taken by the collaboration system; mapping at least one of the actions to one or more application programming interface calls that cause the action to be initiated by the collaboration system; processing at least a portion of the non-HTTP uniform resource identifier text string to construct an application programming interface call; and invoking the constructed application programming interface call.

Figure 9B:
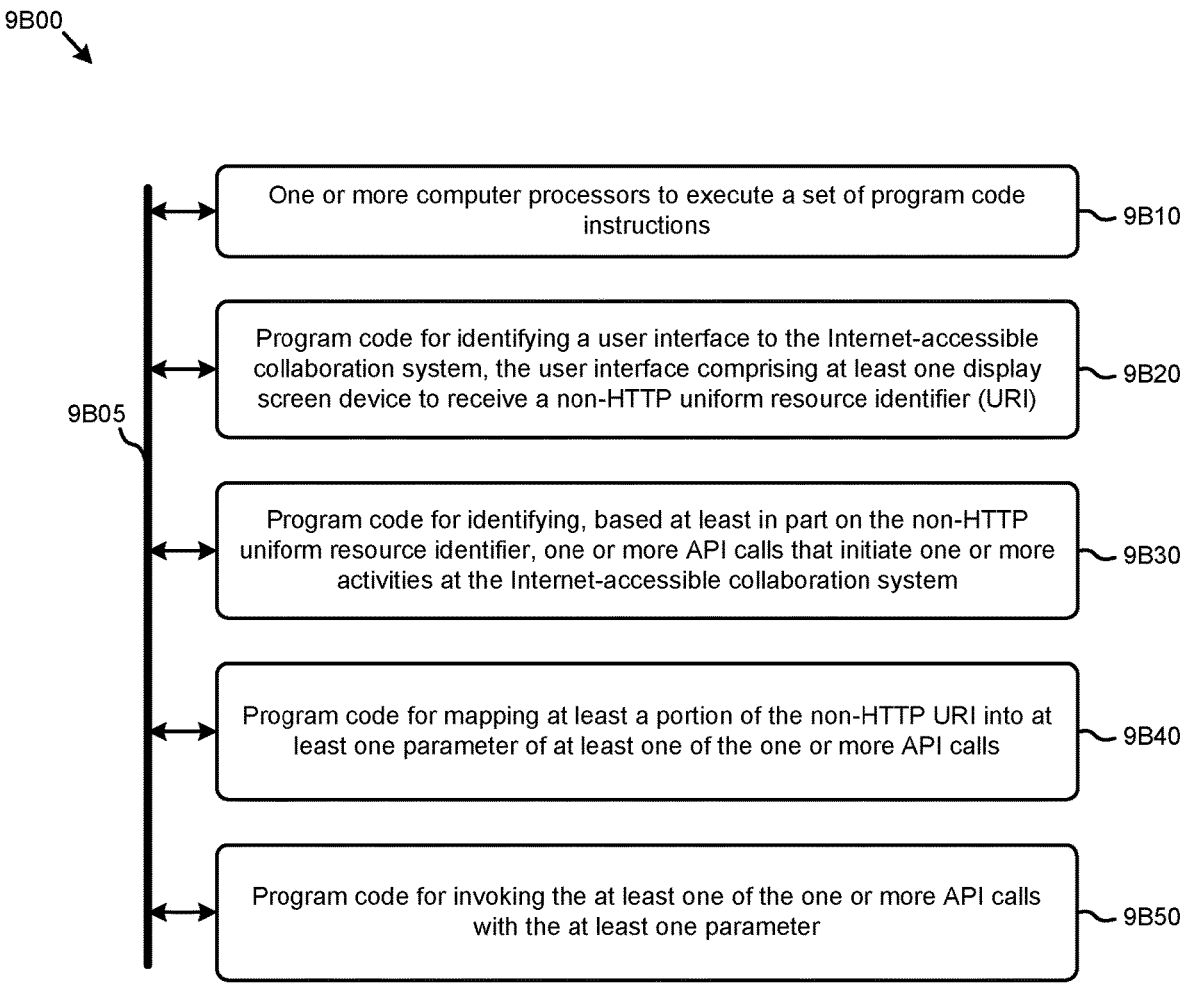
FIG. 9B depicts a system as an arrangement of computing modules that are interconnected so as to operate cooperatively to implement certain of the herein-disclosed embodiments.

FIG. 9B depicts a system 9B00 as an arrangement of computing modules that are interconnected so as to operate cooperatively to implement certain of the herein-disclosed embodiments. The partitioning of system 9B00 is merely illustrative and other partitions are possible. As an option, the system 9B00 may be implemented in the context of the architecture and functionality of the embodiments described herein. Of course, however, the system 9B00 or any operation therein may be carried out in any desired environment. The system 9B00 comprises at least one processor and at least one memory, the memory serving to store program instructions corresponding to the operations of the system. As shown, an operation can be implemented in whole or in part using program instructions accessible by a module. The modules are connected to a communication path 9B05, and any operation can communicate with other operations over communication path 9B05. The modules of the system can, individually or in combination, perform method operations within system 9B00. Any operations performed within system 9B00 may be performed in any order unless as may be specified in the claims. The shown embodiment implements a portion of a computer system, presented as system 9B00, comprising one or more computer processors to execute a set of program code instructions (module 9B10) and modules for accessing memory to hold program code instructions to perform: identifying a user interface to the Internet-accessible collaboration system, the user interface comprising at least one display screen device to receive a non-HTTP uniform resource identifier (URI) (module 9B20); identifying, based at least in part on the non-HTTP uniform resource identifier, one or more API calls that initiate one or more activities at the Internet-accessible collaboration system (module 9B30); mapping at least a portion of the non-HTTP URI into at least one parameter of at least one of the one or more API calls (module 9B40); and invoking the at least one of the one or more API calls with the at least one parameter (module 9B50).

System Architecture Overview

Additional System Architecture Examples

Figure 10A:
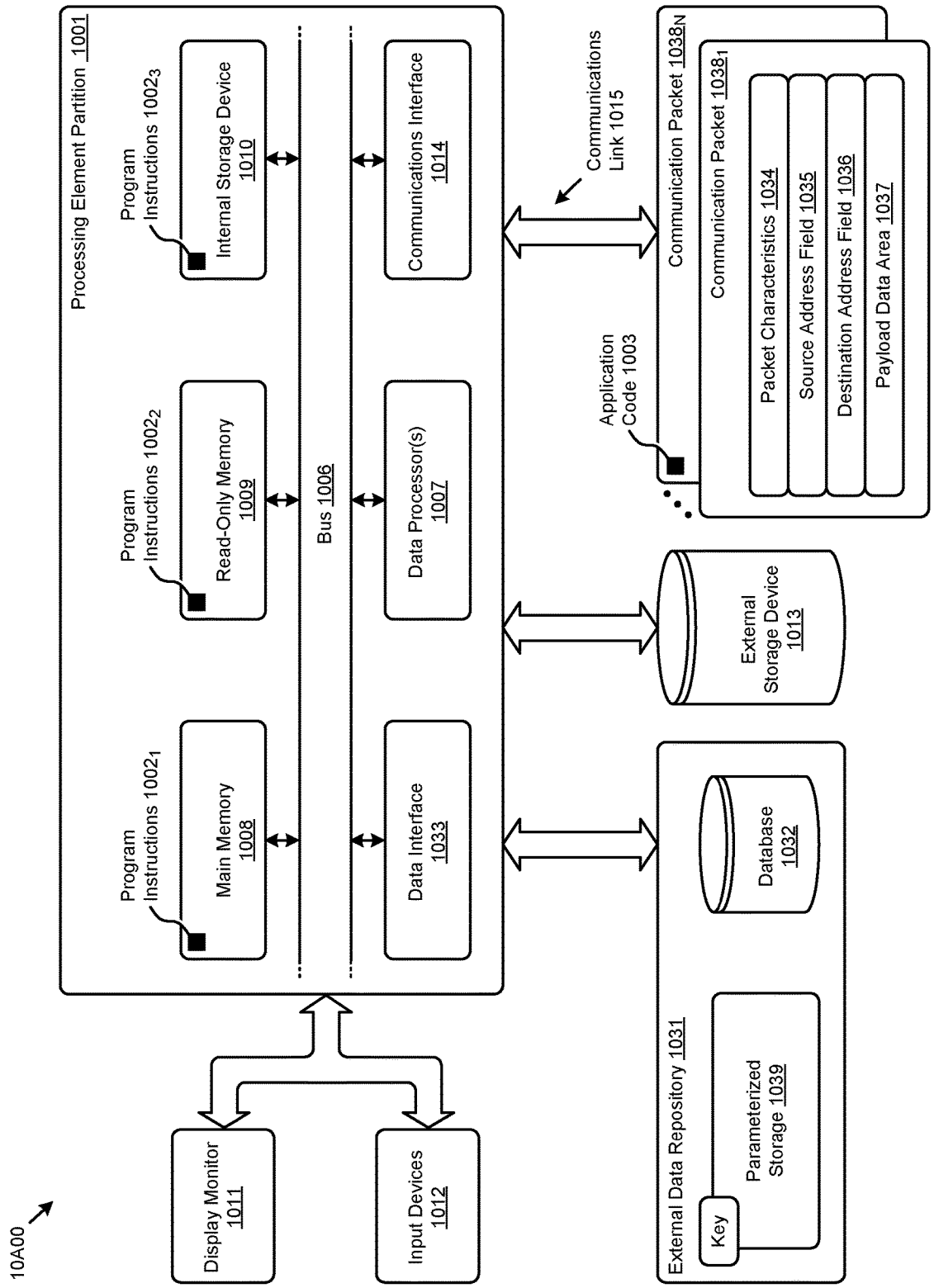
FIG. 10A and FIG. 10B present block diagrams of computer system architectures having components suitable for implementing embodiments of the present disclosure, and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013 (e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program code instructions contained in a memory. Such instructions (e.g., program instructions $1002_1$, program instructions $1002_2$, program instructions $1002_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet $1038_1$, communication packet $1038_N$) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program code may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to collaboration system protocol processing. A module may include one or more state machines and/or combinational logic used to implement or facilitate the operational and/or performance characteristics pertaining to protocol-level processing of collaboration system actions.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of collaboration system protocol processing). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to collaboration system protocol processing, and/or for improving the way data is manipulated when performing computerized operations pertaining to techniques for deploying a protocol engine to user devices that abstract implementation details from an app or user.

Figure 10B:
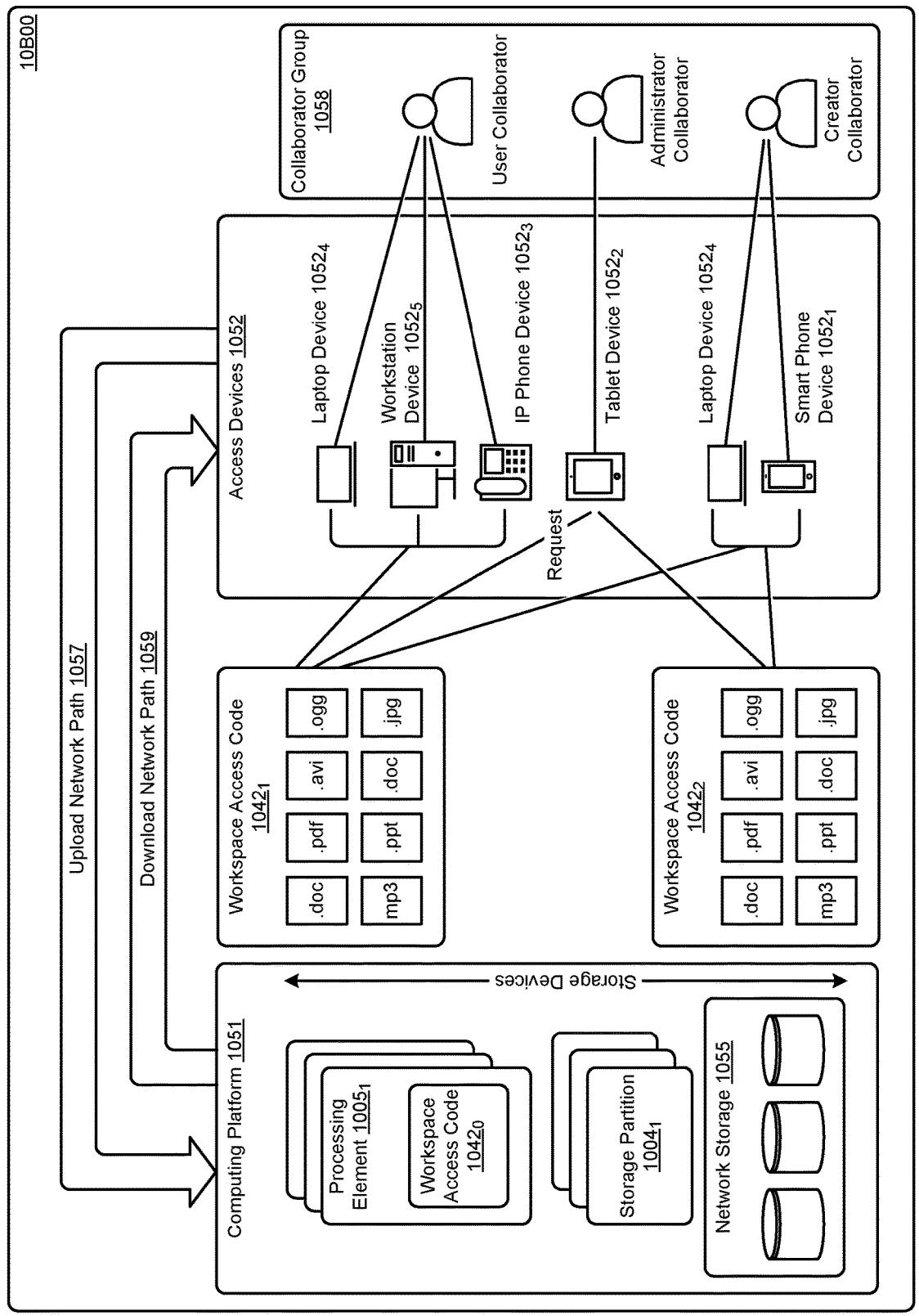

FIG. 10B depicts a block diagram of an instance of a cloud-based environment 10B00. Such a cloud-based environment supports access to workspaces through the execution of workspace access code (e.g., workspace access code $1042_0$, workspace access code $1042_1$, and workspace access code $1042_2$). Workspace access code can be executed on any of access devices 1052 (e.g., laptop device $1052_4$, workstation device $1052_5$, IP phone device $1052_3$, tablet device $1052_2$, smart phone device $1052_1$, etc.). A group of users can form a collaborator group 1058, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element $1005_1$). The workspace access code can interface with storage devices such as networked storage 1055. Storage of workspaces and/or any constituent files or objects, and/or any other code or scripts or data can be stored in any one or more storage partitions (e.g., storage partition $1004_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for forming an application programming interface (API) call to an Internet-accessible collaboration system, the method comprising:
receiving a non-hypertext transfer protocol (non-HTTP) uniform resource identifier (URI) from a user interface communicatively coupled to the Internet-accessible collaboration system, the non-HTTP URI comprising a text string for a processor to identify an action for the Internet-accessible collaboration system to perform as a replacement for invoking the action via user-developed code that invokes an API call, wherein the non-HTTP URI comprises a text string having a format P:// followed by an action portion and a parameter portion where P corresponds to a protocol;
identifying the API call based at least in part on mapping an action term in the action portion of the non-HTTP URI to the API call;
identifying a parameter for the API call from the parameter portion of the non-HTTP URI;
constructing the API call based at least in part on the action and the parameter from the non-HTTP URI; and
invoking the API call with the parameter.

2. The method of claim 1, wherein the non-HTTP URI is a string received at a text input area of a browser.

3. The method of claim 1, wherein the text string comprises the action portion followed by the parameter portion, wherein the action portion is separated from the parameter portion by a "/" symbol.

4. The method of claim 1, wherein the action portion refers to actions that are partially performed at a user device and partially performed at the Internet-accessible collaboration system.

5. The method of claim 1, wherein the API call comprises a first action that is initiated at a user device and wherein the API call comprises a second action that is initiated at the Internet-accessible collaboration system.

6. The method of claim 5, wherein a portion of the second action is embodied as a web service.

7. The method of claim 1, wherein the identifying the parameter comprises at least one of a look-up into a data structure or a query to the Internet-accessible collaboration system.

8. The method of claim 1, further comprising downloading a collaboration system user interface module.

9. The method of claim 8, wherein the collaboration system user interface module comprises at least one of a web application or a web browser plug-in.

10. The method of claim 8, wherein the collaboration system user interface module is an application that is configured to execute on a user device without a web browser.

11. A non-transitory computer readable medium having stored thereon a sequence of instructions executable by one or more processors causing the one or more processors to perform a set of acts for forming an application programming interface (API) call to an Internet-accessible collaboration system, the set of acts comprising:
receiving a non-hypertext transfer protocol (non-HTTP) uniform resource identifier (URI) from a user interface communicatively coupled to the Internet-accessible collaboration system, the non-HTTP URI comprising a text string for a processor to identify an action for the Internet-accessible collaboration system to perform as a replacement for invoking the action via user-developed code that invokes an API call, wherein the non-HTTP URI comprises a text string having a format P:// followed by an action portion and a parameter portion where P corresponds to a protocol;
identifying the API call based at least in part on mapping an action term in the action portion of the non-HTTP URI to the API call;
identifying a parameter for the API call from the parameter portion of the non-HTTP URI;
constructing the API call based at least in part on the action and the parameter from the non-HTTP URI; and
invoking the API call with the parameter.

12. The non-transitory computer readable medium of claim 11, wherein the non-HTTP URI is a string received at a text input area of a browser.

13. The non-transitory computer readable medium of claim 11, wherein the text string comprises the action portion followed by the parameter portion, wherein the action portion is separated from the parameter portion by a "/" symbol.

14. The non-transitory computer readable medium of claim 11, wherein the action portion refers to actions that are partially performed at a user device and partially performed at the Internet-accessible collaboration system.

15. The non-transitory computer readable medium of claim 11, wherein the API call comprises a first action that is initiated at a user device and wherein the API call comprises a second action that is initiated at the Internet-accessible collaboration system.

16. The non-transitory computer readable medium of claim 15, wherein a portion of the second action is embodied as a web service.

17. The non-transitory computer readable medium of claim 11, wherein the identifying the parameter comprises at least one of a look-up into a data structure or a query to the Internet-accessible collaboration system.

18. The non-transitory computer readable medium of claim 11, further comprising instructions executable by the one or more processors causing the one or more processors to perform acts of downloading a collaboration system user interface module.

19. A system for forming an application programming interface (API) call to an Internet-accessible collaboration system, the system comprising:
 a storage medium having stored thereon a sequence of instructions; and
 one or more processors that execute the sequence of instructions to cause the one or more processors to perform a set of acts, the set of acts comprising:
  receiving a non-hypertext transfer protocol (non-HTTP) uniform resource identifier (URI) from a user interface communicatively coupled to the Internet-accessible collaboration system, the non-HTTP URI comprising a text string for a processor to identify an action for the Internet-accessible collaboration system to perform as a replacement for invoking the action via user-developed code that invokes an API call, wherein the non-HTTP URI comprises a text string having a format P:// followed by an action portion and a parameter portion where P corresponds to a protocol;
  identifying the API call based at least in part on mapping an action term in the action portion of the non-HTTP URI to the API call;
  identifying a parameter for the API call from the parameter portion of the non-HTTP URI;
  constructing the API call based at least in part on the action and the parameter from the non-HTTP URI; and
  invoking the API call with the parameter.

20. The system of claim 19, wherein the non-HTTP URI is a string received at a text input area of a browser.

* * * * *